United States Patent [19]
Grantham et al.

[11] Patent Number: 5,285,744
[45] Date of Patent: Feb. 15, 1994

[54] COAXIAL HOSE ASSEMBLY

[75] Inventors: Rodger P. Grantham, Springfield, Mo.; Glenn K. Walker, Miamisburg, Ohio

[73] Assignee: Vapor Systems Technologies, Inc., Dayton, Ohio

[21] Appl. No.: 940,528

[22] Filed: Sep. 4, 1992

[51] Int. Cl.$^5$ .................... B65B 3/18; F16L 47/00; F16L 9/18
[52] U.S. Cl. ...................... 141/59; 141/392; 141/44; 138/113; 138/114; 285/133.1
[58] Field of Search ........... 141/206, 59, 44–46, 141/392; 138/114, 113; 285/133.1

[56] References Cited
U.S. PATENT DOCUMENTS

| | | | |
|---|---|---|---|
| 4,570,686 | 2/1986 | Devine | 141/392 X |
| 4,687,033 | 8/1987 | Furrow et al. | |
| 4,754,782 | 7/1988 | Grantham | 138/113 X |
| 4,922,971 | 5/1990 | Grantham | 141/1 |
| 5,005,613 | 4/1991 | Stanley | 141/45 |
| 5,035,271 | 7/1991 | Carmack et al. | 141/206 |
| 5,042,537 | 8/1991 | Grantham | 141/59 |
| 5,102,012 | 7/1992 | Foster | 141/59 X |
| 5,141,037 | 8/1992 | Carmack et al. | 141/206 |
| 5,197,523 | 3/1993 | Fink, Jr. et al. | 141/206 |

*Primary Examiner*—Ernest G. Cusick
*Attorney, Agent, or Firm*—Jacox & Meckstroth

[57] ABSTRACT

An extended flexible polyurethane inner hose defines a fuel supply passage and is surrounded by an unbonded braided nylon reinforcement filament. The inner hose extends within a molded polyurethane and flexible corrugated outer hose which defines an annular fuel vapor return passage around the inner hose. Corresponding end portions of the hoses are connected to a fuel dispensing nozzle by a tubular metal inner coupling member, a tubular nylon outer coupling member, and a nylon nut. A small flexible fuel evacuation tube extends within the lower portion of the vapor return passage adjacent the inner hose, and an annular rotary coupling or union member and ring seals are confined between the inner and outer coupling members to define a fuel evacuation passage which connects the evacuation tube to a corresponding tube within the dispensing nozzle. The opposite end portions of the inner and outer hoses are connected by corresponding tubular coupling members to a fuel dispensing pump, and a support yoke, clamping ring and nut cooperate to prevent rotation of the hoses after they are connected to the dispensing pump. The nylon outer coupling members and nuts are carbon filled to be electrically conductive and are connected by a static wire helically wound around the inner hose.

18 Claims, 2 Drawing Sheets

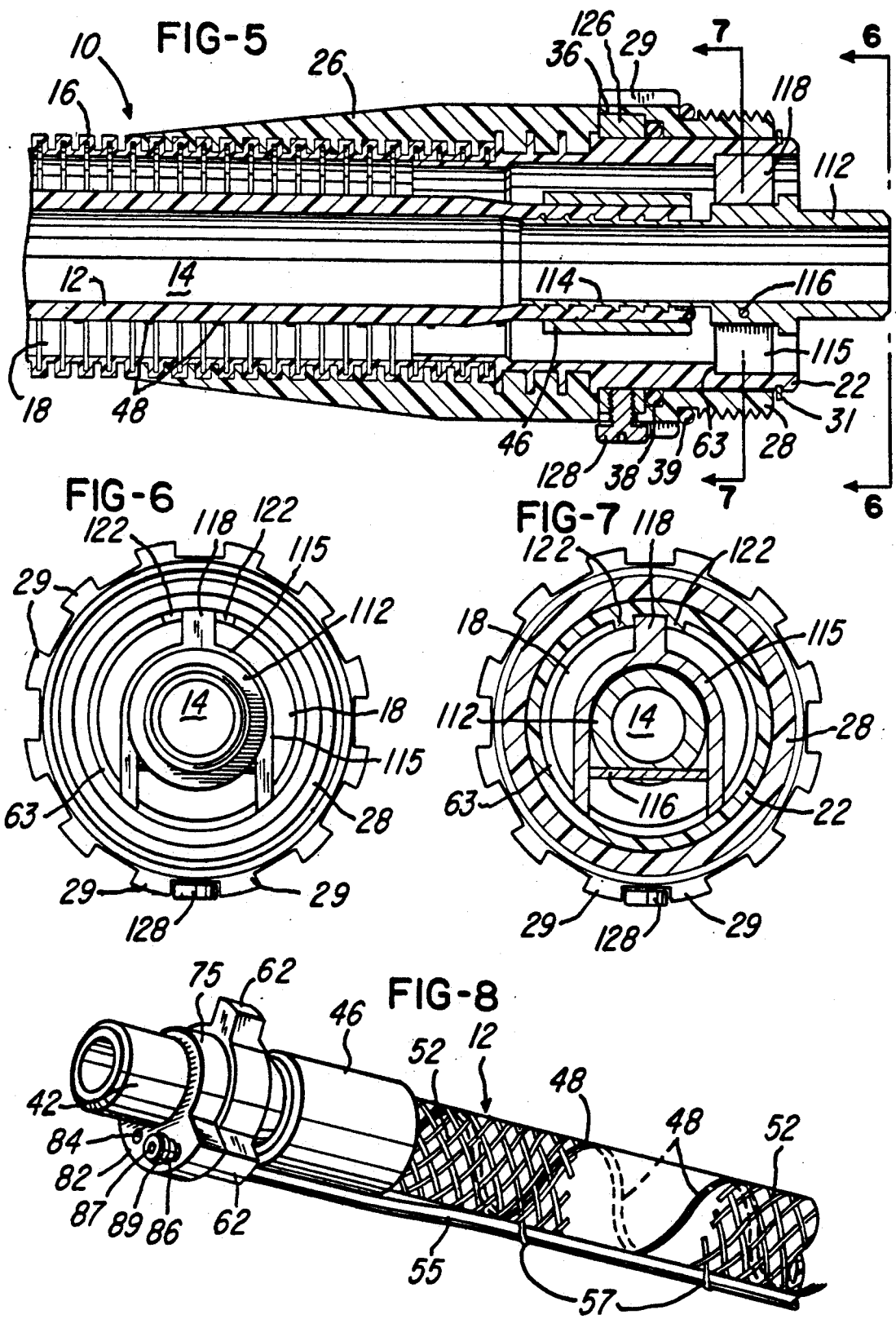

COAXIAL HOSE ASSEMBLY

BACKGROUND OF THE INVENTION

In a vapor recovery fuel dispensing nozzle of the type disclosed in U.S. Pat. No. 5,035,271, liquid fuel is supplied to the nozzle through a flexible inner hose of a coaxial hose assembly. The inner hose extends through a flexible outer hose which cooperates with the inner hose to define an annular vapor return passage. As discussed in this patent, the inner and outer hoses are connected to the nozzle by corresponding inner and outer tubular coupling members, and a small flexible fuel evacuation tube extends from the nozzle downwardly through the vapor return passage into the lowermost portion of the vapor return passage of the draping coaxial hoses. The nozzle produces a suction within the evacuation tube for removing any liquid fuel which collects or condenses within the lower portion of the vapor return passage in order to keep the passage open.

When a nozzle as disclosed in the above patent is rotated relative to the coaxial hoses, the evacuation tube shifts circumferentially within the vapor return passage due to the width and lateral stiffness of the evacuation tube. The coaxial hoses may also be connected to the dispensing nozzle with a positive connection so that the coaxial hoses rotate with the nozzle, for example as shown in U.S. Pat. No. 4,687,033. In this patent, a venturi pump is located in the outer end portion of the fuel supply hose and is connected to a small evacuation tube which extends downwardly into the vapor return passage to the lowermost portion of the passage. The pump and tube aspirate fuel collected or condensed within the vapor return passage back into the product or fuel supply hose upstream of the nozzle.

SUMMARY OF THE INVENTION

The present invention is directed to an improved coaxial hose assembly which is ideally suited for use with a dispensing nozzle as disclosed in above-mentioned U.S. Pat. No. 5,035,271. The invention provides for full rotation or swiveling of the dispensing nozzle relative to the connected coaxial hose while maintaining continuous fluid communication between an evacuation tube within the hoses and a separate corresponding evacuation tube within the nozzle. In accordance with one embodiment of the invention, a rotary fluid coupling or union member and ring seals are confined between the inner and outer tubular couplings which connect the outer ends of the coaxial hoses to the nozzle, and cooperate to define an annular evacuation passage for connecting the evacuation tubes. The coaxial hose assembly of the invention also provides for a simplified inner hose construction along with improved means for obtaining electrical conductivity along the entire length of the hose assembly from the dispensing pump to the dispensing nozzle for dissipating any static electrical charges which may develop.

In accordance with one embodiment of the invention, the above features are provided by a flexible extruded polyurethane inner fuel supply hose which is surrounded by an unbonded braided nylon reinforcement filament. The inner hose extends within a flexible corrugated molded nylon outer hose which defines a fuel vapor return passage around the inner hose. A tubular metal inner coupling member connects one end of the inner hose to the nozzle, and a nylon outer tubular coupling and a surrounding nylon nut connect the outer hose to the nozzle. A rotary union member is confined between the inner and outer tubular couplings and supports resilient sealing rings for defining an annular fuel evacuation passage which connects an evacuation tube within the hoses to a corresponding evacuation tube within the nozzle. The opposite end portions of the coaxial hoses are connected to a dispensing pump by similar inner and outer tubular couplings and a surrounding nut. A yoke member positions the inner coupling within the outer coupling, and a clamping ring secures the coaxial hoses from rotating after the hoses are connected to the pump by the nut.

Other features and advantages of the invention will be apparent from the following description, the accompanying drawing and the appended claims.

BRIEF DESCRIPTION OF THE DRAWINGS

FIG. 5 is an axial section of the opposite or inner end portion of the coaxial hose assembly shown in FIG. 1;

FIG. 6 is an end view taken generally on the line 6—6 of FIG. 5;

FIG. 7 is a section taken generally on the line 7—7 of FIG. 5; and

FIG. 8 is a perspective view of the outer end portion of the internal components of the hose assembly shown in FIG. 1.

DESCRIPTION OF THE PREFERRED EMBODIMENT

Figure 1:
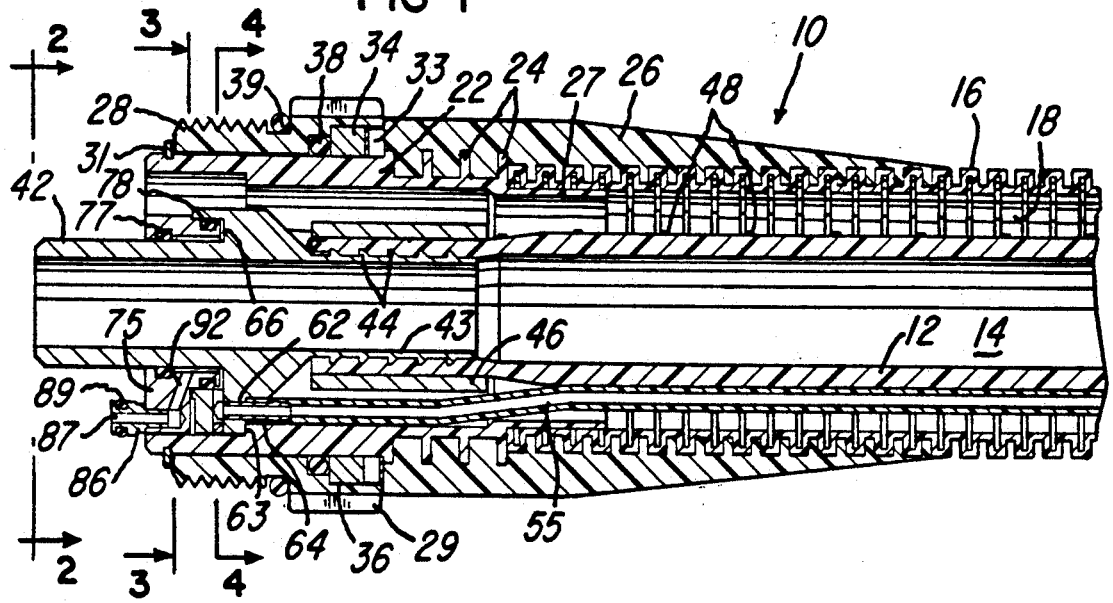
FIG. 1 is an axial section of the outer end portion of a coaxial hose assembly constructed in accordance with the invention.

FIGS. 1 and 5 show opposite end portions of a coaxial hose assembly 10 which includes an extruded polyurethane flexible inner hose 12 defining a passage 14 for supplying liquid fuel from a dispensing pump (not shown) connected to the inner end portion (FIG. 5) of the hose assembly to a dispensing nozzle (not shown) connected to the outer end portion (FIG. 1) of the hose assembly. The inner hose 12 is surrounded by a flexible outer hose 16 molded of a plastics material such as polyurethane or HYTREL and having a corrugated configuration in axial cross-section. The outer hose 16 cooperates with the inner hose 12 to define an annular fuel vapor return passage 18 which varies according to the relative positions of the inner and outer hoses.

Referring to FIGS. 1-4 the outer end portion of the hose assembly 10 includes a tubular outer coupling member 22 which is molded of a carbon filled nylon material so that it is electrically conductive. The coupling member 22 includes a series of three axially spaced and circumferentially extending ribs 24 which project outwardly into a molded polyurethane and slightly flexible sleeve or collar 26. The outer coupling member 22 also includes a cylindrical inner end portion 27 which projects into a surrounding end portion of the outer hose 16. The collar 26 is molded around the inner end portion 27 of the coupling member 22 and the overlying end portion of the outer hose 16 so that the polyurethane material projects into the axially spaced grooves within the outer hose for positively connecting or securing the outer hose to the outer coupling member.

An annular nut 28 has outwardly projecting lugs 29 and is also molded of a carbon filled nylon material in order to be electrically conductive. The nut is rotatably supported on the outer end portion of the outer coupling member 22. A metal retaining ring 31 retains the nut 28 on the coupling member 22, and an annular wavy or Belville spring washer 33 and aluminum spacer ring 34 are confined within a counterbore 36 within the nut 28. The washer 33 urges the nut continuously against the retaining ring 31 to maintain electrical continuity between the coupling member 22 and nut 28. A resilient or rubber O-ring 38 forms a fluid-tight seal between the nut 28 and the coupling member 22, and another resilient O-ring 39 surrounds the nut 28 and forms a fluid-tight seal between the nut and a receiving end portion of the dispensing nozzle.

The outer end portion of the hose assembly 10 also includes an inner coupling member 42 (FIG. 1) which is machined of aluminum and includes an inner end portion 43 which projects into the end portion of the inner hose 12 and has axially spaced circumferential ribs 44 which project outwardly into the inner hose 12. A cylindrical aluminum ferrule 46 surrounds the end portion of the inner hose 12 and is crimped to compress the hose firmly against the end portion 43 of the coupling member 42. The concentrically spaced inner and outer coupling members define an extension of the vapor return passage 18.

A multiple strand stainless steel flat wire 48 (FIG. 8) is helically wound around the inner hose 12 and is surrounded by braided nylon filaments 52 (FIG. 8) which are firmly wrapped on the hose 12 but are not bonded to the hose. The wire 48 and braided filaments 52 extend into the cylindrical ferrule 46, and the end portion of the wire 48 is bent inwardly around the inner end of inner hose to engage the inner portion 43 of the metal coupling member 42 to provide electrical continuity between the wire 48 and the inner coupling member 42.

A flexible extruded plastic or polyurethane evacuation tube 55 extends within the vapor return passage 18 adjacent the inner hose 12 and is retained against the braided nylon filaments 52 by extending the tube 55 under outwardly projecting loops 57 (FIG. 8) formed by the filaments 52 at longitudinally spaced intervals along the inner tube 12. The inner end portion of the evacuation tube 55 terminates at the lowermost portion of the vapor return passage 18 and remains on the bottom of the inner hose 12 which is prevented from rotating after it is installed, as will be explained later.

Figure 4:
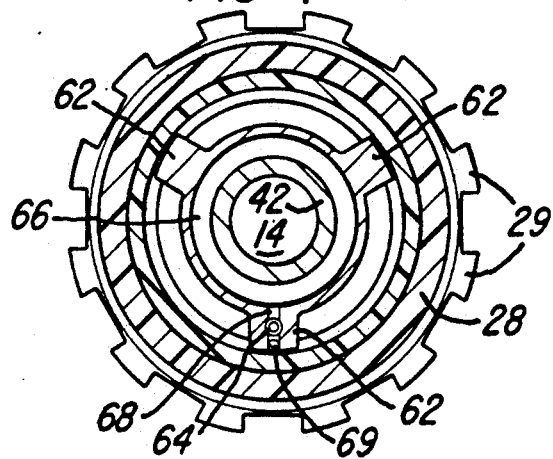
FIG. 4 is a section taken generally on the line 4—4 of FIG. 1.

As shown in FIG. 4, the inner coupling member 42 includes three uniformly spaced and outwardly projecting lugs or ribs 62 which engage the inner surface of the outer coupling member 22 adjacent an annular shoulder 63 for positioning the inner coupling member 42 concentrically within the outer coupling member 22. The ribs 62 also provide electrical continuity between the inner coupling member 42 and the outer coupling member 22. A small aluminum tube 64 (FIG. 4) projects axially through the lower rib 62 and is press-fitted into the rib. The tube 64 receives the outer end portion of the evacuation tube 55, as shown in FIG. 1. An annular channel or recess 66 (FIG. 1) is formed within the inner coupling member 42 and connects with the passage defined by the tube 64 by a radial port 68 within the bottom rib 62. The outer end portion of the radial port 68 (FIG. 4) which is closed by a ball-like plug 69 pressed and staked into the outer end portion of the port 68.

Figure 2:
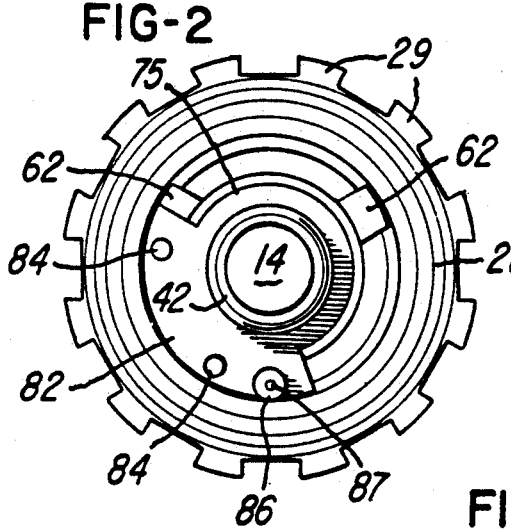
FIG. 2 is an end view taken generally on the line 2—2 of FIG. 1.
Figure 3:
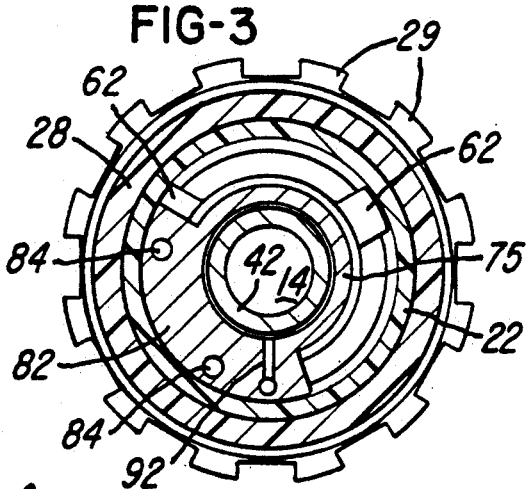
FIG. 3 is a section taken generally on the line 3—3 of FIG. 1.

An annular rotary coupling or union member 75, formed of aluminum, surrounds the outer end portion of the coupling member 42 and extends into the annular cavity 66. A clearance space is defined between the union member 75 and the outer cylindrical surface of the coupling member 42 and the radial bottom surface of the cavity 66, and a set of resilient or rubber "O" rings 77 and 78 form rotary fluid-tight seals between the union member 75 and the coupling member 42. As shown in FIG. 2, the union member 75 includes an arcuate portion 82 which projects radially outwardly to the outer coupling member 22 but with a slight clearance so that the union member 75 is free to rotate through 360° on the outer cylindrical end portion of the coupling member 42. The arcuate portion 82 has a pair of circumferentially spaced holes 84 and supports a small tubular fitting 86 (FIGS. 1 & 2) which has an internal passage 87 and a surrounding "O" ring 89. A passage 92 (FIG. 1) extends from the passage 87 within the fitting 86 to the annular clearance space defined between the union member 75 and the inner coupling member 42.

In reference to above-mentioned Pat. No. 5,035,271, the disclosure of which is incorporated by reference, when the outer end portion of the hose assembly 10 is assembled to the end nut portion 61 of the nozzle shown in FIG. 1, the tubular fitting 86 projects into a hole for connecting the passage 87 to the passage defined by the evacuation tube 175 shown in FIG. 4 of the patent. The holes 84 within the rotary union member 75 receive corresponding positioning pins (not shown) which project rearwardly from the nozzle in place of the screws 183 shown in FIG. 2 of the patent to prevent any lateral forces on the fitting 86. Thus the passages defined within the rotary union member 75 and between the union member 75 and the inner coupling member 42 form a continuous fluid or liquid path between the evacuation tube 175 shown in the above patent and the evacuation tube 55 within the hose assembly 10. In addition, this evacuation passage defined by the rotary union member 75 forms a continuous fluid connection regardless of the rotary position of the dispensing nozzle and the rotary union member 75 relative to the hose assembly 10.

Referring to FIGS. 5-7, the opposite or inner end portion of the hose assembly 10 is constructed very similar to the outer end portion of the hose assembly, and accordingly, the same reference numbers are used for the same corresponding parts or components. However, since the inner end portion of the hose assembly does not have the evacuation tube 55, the inner end portion does not use a rotary union member 75. Thus in place of the inner coupling member 42, the inner end portion of the hose assembly 10 includes a modified inner metal or aluminum tubular coupling member 112 having an inner end portion 114 connected to the inner hose 12 by a crimped ferrule 46. The inner coupling member 112 is positioned concentrically within the outer coupling member 22 by a generally U-shaped yoke member 115 which seats within the outer coupling member 22 adjacent the shoulder 63. A cross pin 116 (FIGS. 5 & 7) extends between the parallel legs of the retaining yoke member 115 and through an aligned hole within the inner coupling member 112. The projecting base or tab portion 118 of the retaining member 115 projects outwardly into a mating cavity defined between parallel ribs 122 molded as an integral part of the outer coupling member 22. The connecting cross pin 116 and the tab portion 118 between the ribs 122 prevent relative rotation between the inner hose 12 and outer hose 16. In addition, the yoke member 115 limits inward axial movement of the inner hose 12 and inner coupling 112 within the outer hose 16 and outer coupling 22.

As shown in FIG. 5, in place of the spring washer 33 (FIG. 1) and spacer ring 34 within the counterbore 36 of the nut 28, a metal clamping ring 126 is confined within the counterbore 36. The clamping ring 126 has a radial threaded hole which receives a set screw 128 which clamps the ring 126 to the outer coupling member 22. The screw 128 is inserted after the nut 28 is threaded into the mating threaded opening within the dispensing pump and the inner and outer tubes are orientated so that the evacuation tube 55 is located on the bottom of the inner hose 12. The head of the screw 128 is confined between two adjacent lugs 29 of the nut 28 so that the hose assembly 10 cannot rotate relative to the nut 28 which is tightened into the threaded opening within the dispensing pump.

After the inner hose sub-assembly is inserted into the outer hose sub-assembly, the outer hose 16 is compressed axially so that the inner coupling member 112 (FIG. 5) projects from the surrounding outer coupling member 22 by a distance sufficient to insert the yoke member 118 and then the cross pin 116. The outer hose 16 is then released so that the hose 16 extends and the yoke member enters the outer coupling member 22 to engage the shoulder 63.

From the drawings and the above description, it is apparent that a hose assembly constructed in accordance with the present invention, provides desirable features and advantages. For example, one desirable feature is provided by the assembly of the rotary union member 75 within the inner coupling member 42 for providing a continuous fuel evacuation passage for the evacuation tube 55 regardless of the rotary position of the dispensing nozzle relative to the hose assembly 10. The construction of the inner extruded polyurethane hose 12 reinforced by the unbonded braided nylon filament 52 also provides for a kink resistant reinforced inner hose 12 with an extended service life. In addition, the electrically conductive carbon filled nylon outer coupling members 22 and coupling nuts 28 cooperate with the helically wound multiple strand wire 48 to provide an electrically conductive path from one end of the hose assembly to the opposite end for effectively dissipating any static charge developed in the hose and/or nozzle assembly. The structure of the inner end portion of the hose assembly 10 (FIGS. 5-7) also provides for conveniently connecting the coaxial hose assembly to the dispensing pump and for preventing rotation of the hose assembly to assure that the fuel evacuation tube 55 remains at the bottom of the annular fuel vapor return passage 18.

While the form of hose assembly herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. A coaxial hose assembly for connecting a fuel dispensing pump to a fuel dispensing nozzle housing an evacuation passage, comprising an elongated flexible inner hose having opposite end portions and defining a fuel passage for directing a liquid fuel supply from the pump to the nozzle, an elongated outer flexible hose surrounding said inner hose and having corresponding opposite end portions, said inner and outer hoses defining therebetween a longitudinally extending annular vapor passage for returning fuel vapor from the nozzle to the pump, a tubular inner coupling member connected to one of said end portions of said inner hose and a tubular outer coupling member connected to the corresponding said end portion of said outer hose for connecting said hoses to the nozzle, said inner and outer coupling members defining therebetween a fuel vapor passage forming an extension of said vapor passage defined between said hoses, means defining a longitudinally extending fuel evacuation passage within said hoses and connected to said vapor passage, rotary coupling means for connecting said evacuation passage within said hoses to the vacuation passage within the nozzle, and said rotary coupling means providing for substantial rotation of the nozzle relative to said hoses while maintaining continuous fluid communication between said evacuation passages.

2. A hose assembly as defined in claim 1 and including a tubular nut rotatably supported by said outer coupling member, and said outer coupling member and said nut are molded of a carbon-filled plastics material to provide for electrical conductivity.

3. A hose assembly as defined in claim 2 and including a retaining ring for retaining said nut on said outer coupling member, and a spring washer disposed on said outer coupling member for urging said nut member against said ring member.

4. A hose assembly as defined in claim 1 wherein said inner coupling member defines an annular cavity, and said rotary coupling means include a union member rotatably supported within said cavity.

5. A hose assembly as defined in claim 1 and including a braided flexible filament surrounding said inner hose, and said inner hose is free to move axially within said braided filament.

6. A hose assembly as defined in claim 5 and including at least one electrically conductive wire helically wound on said inner hose and surrounded by said braided filament, and said wire has an end portion connected to said inner coupling member.

7. A hose assembly as defined in claim 1 wherein said inner and outer hoses include corresponding opposite end portions, a second inner coupling member and a second outer coupling member connected to said opposite end portions of said hoses, a nut member rotatably supported by said second outer coupling member, means for supporting said second inner coupling member within said second outer coupling member and for preventing relative rotation, and means for securing said nut member to said second outer coupling member after said nut member is connected to the dispensing pump to prevent rotation of said inner and outer hoses relative to the pump.

8. A hose assembly as defined in claim 7 wherein said securing means comprise a clamping band within said nut member surrounding said outer coupling member, and a screw extending through said nut member and threaded into said band for locking said nut member to said second outer coupling member.

9. A hose assembly as defined in claim 1 wherein said inner hose comprises an extruded plastics material, a braided flexible filament of plastics material surrounding said inner hose, and said inner hose is free to move axially within said braided filament.

10. A hose assembly as defined in claim 1 wherein said outer coupling member has a portion with a plurality of axially spaced circumferential ribs, said outer hose is corrugated in axial cross-section and defines axially spaced circumferential grooves, and a molded sleeve surrounding said portion of said outer coupling and an adjacent end portion of said outer hose and projecting into said grooves and between said ribs.

11. A coaxial hose assembly for connecting a fuel dispensing pump to a fuel dispensing nozzle having an evacuation passage, comprising an elongagated flexible inner hose having opposite end portions and defining a fuel passage for directing a liquid fuel supply from the pump to the nozzle, an elongated outer flexible hose surrounding said inner hose and having corresponding opposite end portions, said inner and outer hoses defining therebetween a longitudinally extending annular vapor passage for returning fuel vapor from the nozzle to the pump, a tubular inner coupling member connected to one of said end portions of said inner hose and a tubular outer coupling member connected to the corresponding said end portion of said outer hose for connecting said hoses to the nozzle, said inner and outer coupling members defining therebetween a fuel vapor passage forming an extension of said vapor passage defined between said hoses, means defining a longitudinally extending fuel evacuation passage within said hoses and connected to said vapor passage, a rotary union member disposed between said inner and outer coupling members and defining an evacuation passage connected to said evacuation passage within said hoses, means for connecting said evacuation passage within said rotary union member to the evacuation passage within the nozzle, and annular seal means cooperating with said rotary union member to provide for rotation of the nozzle relative to at least one of said hoses while maintaining continuous fluid communication between said evacuation passages.

12. A hose assembly as defined in claim 11 wherein said inner coupling member defines an annular cavity, said union member is rotatably supported within said cavity, and a fitting mounted on said union member for connecting said union member to the nozzle.

13. A hose assembly as defined in claim 12 wherein said union member includes an arcuate section supporting said fitting, and means on said arcuate section for connecting said union member to the nozzle for rotation of said union member with the nozzle.

14. A coaxial hose assembly adapted for connecting a fuel dispensing pump to a fuel dispensing nozzle, comprising an elongated flexible inner hose of extruded plastics material and having opposite end portions, said inner hose defining a passage for directing a liquid fuel supply from the pump to the nozzle, an elongated outer flexible hose surrounding said inner hose and having corresponding opposite end portions, said inner and outer hoses defining therebetween a longitudinally extending annular passage for returning fuel vapor from the nozzle to the pump, a tubular inner coupling member connected to one of said end portions of said inner hose and a tubular outer coupling member connected to the corresponding said end portion of said outer hose for connecting said hoses to the nozzle, said inner and outer coupling members defining therebetween a fuel vapor passage forming an extension of said vapor passage defined between said hoses, a braided flexible filament of plastics material surrounding said inner hose, said inner hose being free to move axially within said braided filament, and said braided filament being exposed to said vapor passage.

15. A hose assembly as defined in claim 14 and including at least one metal wire helically wound on said inner hose and surrounded by said braided filament, and said wire has an end portion connected to said inner coupling member.

16. A hose assembly as defined in claim 14 and including a tubular nut rotatably supported by said outset coupling member, and said outer coupling member and said nut are molded of a carbon-filled plastics material to provide for electrical conductivity.

17. A coaxial hose assembly for connecting a fuel dispensing pump to a fuel dispensing nozzle having an evacuation passage, comprising an elongated flexible inner hose having opposite end portions and defining a fuel passage for directing a liquid fuel supply from the pump to the nozzle, an elongated outer flexible hose surrounding said inner hose and having corresponding opposite end portions, said inner and outer hoses defining therebetween a longitudinally extending annular vapor passage for returning fuel vapor from the nozzle to the pump, a tubular inner coupling member connected to one of said end portions of said inner hose and a tubular outer coupling member connected to the corresponding said end portion of said outer hose for connecting said hoses to the nozzle, said inner and outer coupling members defining therebetween a fuel vapor passage forming an extension of said vapor passage defined between said hoses, means defining a longitudinally extending fuel evacuation passage within said hoses and connected to said vapor passage, rotary coupling means for connecting said evacuation passage within said hoses to the evacuation passage within the nozzle, said rotary coupling means including a union member disposed between said inner and outer coupling members and having an arcuate section supporting a fitting connected with the evacuation passage within the nozzle, means on said arcuate section for positively connecting said union member to the nozzle for rotation of said union member with the nozzle, and said rotary coupling means providing for substantial rotation of the nozzle relative to said hoses while maintaining continuous fluid communication between said evacuation passages.

18. A coaxial hose assembly for connecting a fuel dispensing pump to a fuel dispensing nozzle having an evacuation passage, comprising an elongated flexible inner hose having opposite end portions and defining a fuel passage for directing a liquid fuel supply from the pump to the nozzle, an elongated outer flexible hose surrounding said inner hose and having corresponding opposite end portions, said inner and outer hoses defining therebetween a longitudinally extending annular vapor passage for returning fuel vapor from the nozzle to the pump, a tubular inner coupling member connected to one of said end portions of said inner hose and a tubular outer coupling member connected to the corresponding said end portion of said outer hose for connecting said hoses to the nozzle, said inner and outer coupling members defining therebetween a fuel vapor passage forming an extension of said vapor passage defined between said hoses, means defining a longitudinally extending fuel evacuation passage within said hoses and connected to said vapor passage, rotary coupling means for connecting said evacuation passage within said hoses to the evacuation passage within the nozzle, said rotary coupling means providing for substantial rotation of the nozzle relative to said hoses while maintaining continuous fluid communication between said evacuation passages, said inner coupling member including a plurality of circumferentially spaced and integrally formed ribs projecting outwardly and engaging said outer coupling member for positioning said inner coupling member concentrically within said outer coupling member, and said evacuation passage extends through one of said ribs.

* * * * *

UNITED STATES PATENT AND TRADEMARK OFFICE
CERTIFICATE OF CORRECTION

PATENT NO. : 5,285,744
DATED : February 15, 1994
INVENTOR(S) : Rodger P. Grantham & Glenn K. Walker It is certified that error appears in the above-identified patent and that said Letters Patent is hereby corrected as shown below:

In the Claims:
    Column 5,
Claim 1, line 68, cancel "housing" and insert --having--.
    Column 6,
Claim 1, line 20, cancel "vacuation" and insert --evacuation--.
    Column 6,
Claim 8, line 63, after "member" (first occurrence) insert --and--; same line, after "said" insert --second--.
    Column 7,
Claim 11, line 14, cancel "elongagated" and insert --elongated--.
    Column 8,
Claim 16, line 12, cancel "outset" and insert --outer--.

Signed and Sealed this

Fourteenth Day of June, 1994

Attest:

BRUCE LEHMAN

Attesting Officer     Commissioner of Patents and Trademarks